Patented Oct. 27, 1953

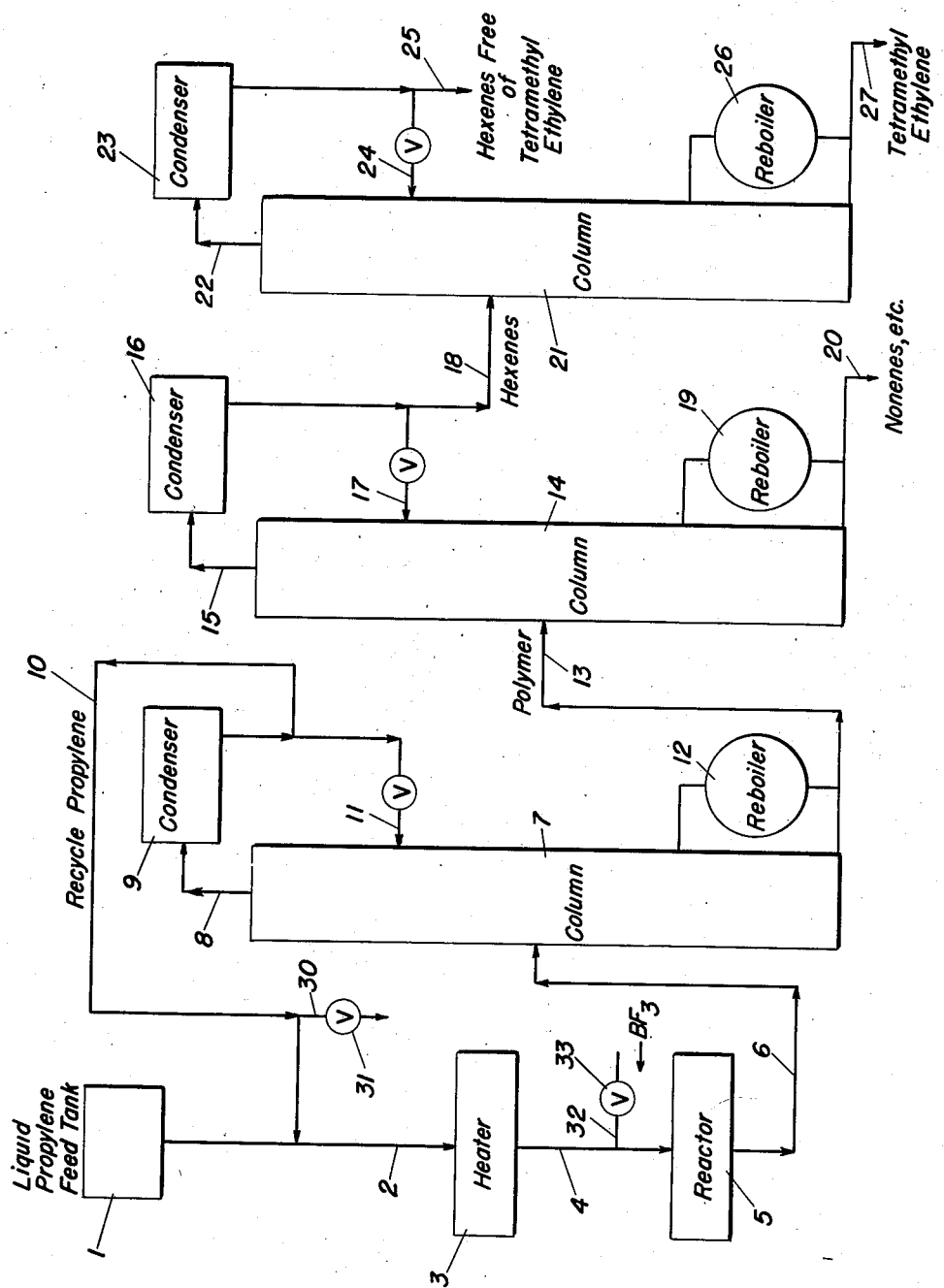

2,657,245

UNITED STATES PATENT OFFICE 2,657,245

PROCESS FOR THE MANUFACTURE OF TETRAMETHYLETHYLENE

John Barry Davidson, Grosse Ile, Mich., assignor to Sharples Chemicals Inc., a corporation of Delaware Application May 28, 1949, Serial No. 96,112

6 Claims. (Cl. 260—683.15)

This invention relates to the production of tetramethylethylene. More particularly it relates to an improved procedure for the manufacture of tetramethylethylene from propylene.

Tetramethylethylene is valuable especially as an intermediate in the manufacture of high octane fuels such as diisopropyl and particularly triptane (2,2,3-trimethylbutane), the latter being one of the most effective known fuels for the generation of power in internal combustion engines.

Unfortunately tetramethylethylene is extremely difficult to prepare economically enough to justify its consumption for the above-mentioned purposes. Propylene, a relatively cheap and abundant raw material, obtainable by the dehydrogenation of propane and formed in most petroleum cracking processes, may be converted in part by methods well known to the art into a mixture of hexenes. Although such procedures are extremely numerous and cover in toto a wide variety of specific operating conditions, no one of these known processes, as far as I am aware, is capable of producing tetramethylethylene economically in useful amounts.

The process of the present invention, on the other hand, provides a polymer product from proplyene which not only contains substantial quantities of the desired hexene, i. e. tetramethylethylene, but also by-products which themselves are of great utility. Furthermore, the tetramethylethylene may be readily separated from the other reaction products by fractional distillation. I have discovered that the combination of operating variables which are necessary for the economical manufacture of tetramethylethylene from propylene are as follows:

(1) That the polymerization reaction be conducted in the liquid phase, (2) that the temperatures employed in the polymerization be relatively low, (3) that the catalyst employed be a BF$_3$ activated solid catalyst carrier which is substantially insoluble in the liquid reaction mixture, (4) that the amount of propylene converted into polymer per pass be restricted, (5) that the polymer formed during each pass over the catalyst be prevented from entering the recycled stream of propylene, (6) that the separation of the polymer from the unreacted propylene be conducted by fractional distillation at a temperature fairly close to the critical temperature of propylene and (7) that the tetramethylethylene be separated from other reaction products by fractional distillation.

By operating continuously with due attention to each of the above enumerated features (to be later more exhaustively discussed) it is possible to obtain a crude polymer containing as much as 70% or more of hexenes of which 15% or more is tetramethylethylene. The hexene isomers other than tetramethylethylene are somewhat more highly branched than is characteristic of hexenes obtained by most polymerization processes of the prior art, and are of considerable value for blending with gasoline (as such or after being hydrogenated) in view of their excellent octane rating. The major part of the non-hexene polymer comprises highly branched nonene isomers which are likewise useful for blending with gasoline or for other purposes, such as for the alkylation of aromatic compounds to form intermediates in the production of surface active agents. The relatively small amount of dodecenes and higher polymers formed find some use as chemical intermediates.

Furthermore, by operating in accordance with my process it is possible to convert the propylene into tetramethylethylene, and the other useful products enumerated above without excessive and uneconomical expenditure of heat.

A preferred method of operation will be described with reference to Figure 1. Liquid propylene from feed tank 1 with recycle propylene from line 10 is caused to flow through line 2 at a suitable rate through heat transfer unit 3 wherein the desired reaction temperature is attained. The heated feed then passes through line 4 over a bed of the solid polymerization catalyst in reactor 5 as such a velocity that a relatively small proportion is converted into polymers.

For best results less than 15% of the proplyene should be converted into polymer per pass. From reactor 5 the crude propylene-polymer mixture in liquid phase flows through line 6 into a central section of fractionating column 7 which is supplied with sufficient heat by means of reboiler 12 to vaporize the unreacted propylene and such additional propylene as is required for reflux purposes. The propylene vapors leave column 7 through line 8, are liquified in condenser 9, and the condensate is divided between reflux line 11 and recycle line 10. This column is suitably operated at a temperature fairly close to the critical temperature of the propylene where the heat of vaporization is relatively small and hence with non-excessive consumption of heat. By suitable adjustment of heat input and reflux, column 7 may be operated to provide a heads stream consisting of polymer-free propylene and a bottoms stream consisting of polymer substantially free of propylenes.

The bottoms from column 7 comprising the polymer fraction is introduced through line 13 into fractionating column 14 wherein it is separated into mixed hexenes overhead and higher polymers below, heat being supplied by re-boiler 19.

The bottoms stream consisting of nonenes together with a small amount of higher polymers is discharged through line 20 for such disposition as is desired.

The mixed hexenes pass overhead through line 15 to condenser 16 and the condensate is divided between reflux line 17 and feed line 18 for column 21 wherein separation is effected into substantially pure tetramethylethylene at the bottom and other hexene isomers (substantially free of tetramethylethylene) at the top. The heat is furnished by re-boiler 26. Since tetramethylethylene boils 6 degrees higher than any other hexene present in the product, this separation can be achieved readily and quite completely.

The tetramethylethylene is removed through line 27. Other hexene products pass through line 22 and condenser 23 whence a portion is returned as liquid reflux through line 24, and the remainder is removed as product through line 25.

The propylene employed as a feed stock may, without disadvantage, contain other substances of the nature of diluents. For example, it may be admixed with considerable quantities of propane, or even ethane or butane. It is preferable, however, that such inert diluents not boil too far below or too far above propylene in order that the problem of subsequent separation be not unduly complicated. The propylene should be substantially free of reactive substances such as would have a deleterious effect upon the catalyst. Likewise the presence of other olefins in substantial quantity is undesirable since these will undergo polymerization and co-polymerization reactions forming polymers of different character and boiling range.

It will be understood that when the propylene feed contains appreciable amounts of propane, the system must be purged continuously or at intervals in order to avoid cumulative dilution of the propylene. This may be done conveniently through line 30 which connects with line 10, and the flow through which is controlled by valve 31.

The temperature employed in the polymerization step may be varied considerably depending upon the activity of the catalyst and the contact time on the catalyst. In any event the reaction temperature should not exceed the critical temperature of the feed (i. e. 94° C. in the case of substantially pure propylene) since an important feature of my process is the maintenance of the reaction mixture in the liquid phase during the polymerization. Reaction temperatures as low as 25° C. have been employed successfully, but in general I prefer to use temperatures above 50° C. and particularly above 70° C. In general the choice of a suitable temperature will represent a compromise since lower temperatures favor the formation of tetramethylethylene, but, at the same time, tend to increase formation of higher polymers to some extent. Also, of course, lower temperatures will require lower space velocities for a given degree of conversion.

A wide variety of catalyst carriers are suitable. Thus practically any solid catalyst carrier, including carriers which in themselves are capable of effecting polymerization of propylene may be employed, providing the carrier is substantially insoluble in the reaction mixture, and is capable of strongly adsorbing boron trifluoride. Catalysts capable of dissolving in or being washed away by the reaction stream will necessarily be carried through from the reactor into the distillation system causing further polymerization of the initially formed hexenes, etc., which is undesirable. Commercial catalysts of the clay type have proven very satisfactory as carriers, for example, those known to the trade as "Kleenflo," "Retrol," "Filtrol," "Granular Bleaching Clay" and "Tonsil." Such clays are most effective when pre-dried to a relatively low water content. They may be employed in various suitable forms, for example, as pellets or grains and, depending upon the particular circumstances, may be arranged within the reactor on trays, in a single porous bed or otherwise. For optimum performance the pores of the pellets or granules should be small enough to provide a relatively large area of contact, yet should not be so small as to retain reaction product in stagnant conditions. Non-clay catalyst carriers may also be employed such as, for example, silica gel, alumina, diatomaceous earth, etc. The choice of the particular catalyst carrier, and its physical form and arrangement within the reactor is within the choice and judgment of one skilled in the art.

It is well known that natural clays as well as synthetic silica-alumina catalysts may be rendered more active by incorporating various readily absorbed acidic polymerization catalysts. For example, small amounts of aluminum chloride, zinc chloride, ferric chloride, boron trichloride, phosphorous pentachloride, arsenic trichloride, stannic chloride, titanium tetrachloride, antimony pentafluoride, beryllium chloride may be employed in conjunction with said aluminum silicates or even relatively inert supports and are illustrative of the Friedel-Crafts type of activator. Activation by means of acids is also known, typical acids suitable for this purpose being hydrogen chloride, hydrogen fluoride, phosphoric acid, sulfuric acid, and others. It will be noted that many of the enumerated activating substances would be somewhat soluble in the reaction mixture undergoing polymerization. They are, however, strongly adsorbed on clays and the like and when employed in sufficiently small proportion are rendered substantially incapable of being washed away from the catalyst support or dissolved in the reaction mixture.

I have found, however, that outstandingly new and unexpected results are obtained when boron trifluoride is employed as the activating substances, and that an excellent means of maintaining clay catalysts in active condition is to introduce, continuously or progressively for make-up purposes, a small stream of boron trifluoride gas into the propylene feed stream (i. e. at any point in the system wherein propylene is substantially the only olefinic material present). In the drawing means for this purpose is illustrated by line 32 which is controlled by valve 33. The boron trifluoride thus introduced becomes adsorbed in its passage over a clay, or other $BF_3$-adsorbing carrier, rendering same highly active and, when the rate of introduction is suitably regulated, no detrimental amount of boron trifluoride is carried through into contact with the polymer product.

It is to be understood, however, that should some boron trifluoride find its way into the still pot along with polymer and unpolymerized propylenes, it would, because of its high vapor pressure at the temperature of the still pot, be almost instantaneously flashed off and would be returned to the catalyst bed in the reactor along with recycle propylene. Any residual boron trifluoride which might remain in the still pot would be of such low concentration as to be incapable of catalyzing further polymerization. This is an outstanding feature of my invention.

However, when I employ boron trifluoride as the activating agent, I prefer to employ a catalyst base which is itself relatively inactive toward olefin polymerization. Such inactive bases having the desired capacity to adsorb boron trifluoride are typified by substances containing a relatively high content of alumina. Highly suitable for this purpose, for example, are alumina gel and the various forms of bauxite including those relatively impure forms sold under the name of "Low Iron Porocel" and "Regular Porocel."

The proportion of boron trifluoride to catalyst base will be determined by the extent of activity it is desired to impart to the catalyst mass. If a catalyst of only moderate activity is desired, as when operating at relatively high temperatures or at low space velocities, as little as about 1% or less such as 0.5% by weight of boron trifluoride may be employed. On the other hand, when operating at relatively low temperatures and/or high space velocities, somewhat higher boron trifluoride concentrations are preferred, such as up to 8 per cent or even, in some instances, as high as 12 per cent of the total weight of the activated catalyst.

In general the activity of the catalyst, as measured by the extent of conversion to polymer per pass or by the temperature elevation across the reactor (under conditions of steady operation) will decrease somewhat as the process proceeds. Thus, after say 10 hours of continuous operation, an increase in the boron trifluoride content of the catalyst beyond that employed at the start may be desirable in order to maintain the desired conversion.

The alumina-containing catalyst base may be treated with the desired amount of boron trifluoride in any convenient manner. For example, the $BF_3$ in gaseous form may be introduced into a suitably disposed bed of said base. This may conveniently be accomplished by placing said base in the polymerization reactor, and subsequently bleeding in the desired quantity of $BF_3$ while taking suitable precautions to insure relatively uniform distribution throughout the catalyst bed. Alternatively said base may be charged into the reactor and the $BF_3$ introduced into the propylene feed at a gradual rate until the desired amount has been added. The strong adsorbing power of the alumina insures that substantially all of the $BF_3$ is removed from the reaction stream. Preferably the rate of introduction of the $BF_3$ should be low enough to avoid any substantial polymerization of the propylene prior to its contact with the solid catalyst bed.

As has been indicated the activity of the catalyst may become reduced as the reaction progresses, and I usually prefer to compensate for such reduced activity by continuously or progressively introducing additional $BF_3$ into the feed propylene stream. The amount of additional $BF_3$ to be introduced for purposes of maintaining more or less uniform catalyst activity is readily determined either by observation of the rate of production of polymer or the increase in temperature of the reaction stream in passing through the reactor. Eventually, as a rule, a condition will be reached whereby the conversion per pass will tend to decrease in spite of the addition of substantial amounts of $BF_3$ to the feed stream, and this condition is indicative that the catalyst bed should be replaced. Decision as to when replacement of the catalyst is desirable is a matter of judgment. The spent catalyst may be regenerated, if desired, such as by treatment with steam or inert gases at elevated temperatures, or by any other methods known to the art.

The alumina containing catalyst base may be employed in the form of granules or pellets having an open pore structure, but are preferably used in the form of a bed of finely divided particles or coarse powders. A state of subdivision ranging from about 20 mesh to 200 mesh is satisfactory, such as from 40 mesh to 80 mesh. This general degree of subdivision is frequently desirable in the case of the clay type catalysts, whether in activated or non-activated state.

A highly critical feature of my process is the control of the extent of conversion of propylene into polymer per pass through the catalyst. By use of active catalysts and relatively longer contact times (low space velocities) it is possible to convert a major part of the propylene into polymers, but such a mode of operation seriously reduces the yield to the desired tetramethylethylene and, furthermore, results in the formation of considerable amounts of higher polymers having lesser commercial value. From the standpoint of economic feasibility it is important that not more than about 20% of the charge (whether of substantially pure propylene or of propylene which is diluted, such as with propane) be converted into polymer in a single pass through the reactor. Preferably the converrsion should be held to less than about 15% of the charge, such as even below 10%. Since, moreover, my process requires separation of unreacted propylene by fractional distillation at a temperature fairly close to the critical temperature, it may be practicable to operate with conversions even as low as 1% or under. Such extremely low conversions per pass will, of course, increase the cost of separating the unreacted propylene, but this will be compensated by the increased yield of tetramethylethylene attainable under these conditions. In general, higher conversions of propylene may be employed when the propylene is diluted with an inert diluent, such as propane, than when little or no diluent is present. The extent of dilution may vary as desired such as from 0% to 70% or even 75%. The optimum conversion to be employed within the indicated limits will largely depend upon economic circumstances prevailing at the time.

As has been mentioned, operation with low conversion per pass is preferably accompanied by the separation of the propylene by fractional distillation at fairly close to but below the critical temperature of the propylene, this temperature being about 95° C. In general the process may be conducted economically when the temperature at the head of the propylene column (column 7 in Figure 1) is not more than 20 degrees below the critical temperature, but this separation is preferably conducted when said temperature is not more than 10 degrees below the critical temperature. In the event that inert diluents boiling below the hexenes are removed simultaneously with the unreacted propylene, the critical temperature will, of course, differ from that of propylene itself. The column preferably should then be operated with a head temperature not more than 20 degrees, and preferably not more than 10 degrees below the critical temperature of the recycle stream.

When propylene is polymerized in accordance with the process of the present invention, substantially no products are formed which interfere with the separation of relatively pure tetramethylethylene by conventional fractional distillation methods. Thus no olefins are present to any significant extent which boil in the same range as tetramethylethylene. In fact, the closest boiling constituent of the crude reaction mixture, present to any significant extent, is a hexene isomer which boils 6 degrees lower than tetramethylethylene. This is an extremely important feature, for the presence of any substantial amount of a by-product boiling at about the same temperature as tetramethylethylene would necessitate more intricate and expensive methods for recovery of the latter.

The practice of my invention is further illustrated by the following specific examples:

Example 1

Propylene was polymerized to tetramethylethylene in a pilot plant substantially similar to the equipment shown in Figure 1, but not equipped with continuous fractionating columns for the separation of the components of the polymeric product.

A polymerization catalyst was prepared by treating a pure grade of 100–200 mesh aluminum oxide gel with ten per cent by weight of aluminum sulfate. The treatment was conducted in the presence of water, the water being removed by heating to 100° C. under vacuum. The catalyst chamber, which had an inside diameter of 1.94 inches, was filled to a height of 15.9 inches with 650 grams of this catalyst.

The polymerization process was conducted by pumping a liquid hydrocarbon mixture of which 95 per cent was propylene through a heater and then at 68° C. through the catalyst chamber at the rate of 136 pounds per hour. Boron trifluoride was added in small portions to the propylene feed stream to activate the catalyst sufficiently to give a fifteen degree temperature rise through the bed. Further quantities of boron trifluoride were added from time to time to maintain this activity until, at the end of the twelve hour run, a total of 27.5 grams had been added. The pressure drop through the reactor was twenty pounds per square inch.

The stream of partially polymerized propylene coming from the reactor was fed into a fractionating column to remove the bulk of the unreacted propylene. The rest of the unreacted propylene was removed at a lower pressure in a second fractionating column. Propylene polymers were withdrawn from the bottom of this second column. The recovered propylene was recycled together with fresh propylene to the reactor.

In the twelve hour run, a total of 136.3 pounds of polymer were obtained, the conversion being 8.34%. The yield of propylene dimer (hexene) was determined by distillation of the polymer and was found to be 60.0%. The nonene yield was 28.4%. The balance of the material consisted of higher boiling polymer, largely dodecene. Careful fractionation of the hexene fraction showed it to contain 20.0% tetramethylethylene. The balance of the hexenes were 2-methylpentenes. The tetramethylethylene yield was calculated to be 12.0%.

Example 2

A run was made by a procedure similar to that described in Example 1 except that a feed composed of 49 per cent propylene and 51 per cent propane was employed. The mixture was fed to the reactor at the rate of 136 pounds per hour. During the four hour run 15.4 grams of boron trifluoride were used to maintain a temperature rise of from 74° C. to 83° C. across the reactor and to produce 31 pounds of polymer.

The conversion of the total feed stream to propylene polymer in this run was 5.7%. The yield of hexene was 56.2%, and nonene 32.2%. The hexene contained 24.8% tetramethylethylene and thus the yield of tetramethylethylene was 14.0%.

The following examples illustrate practice of my process with relatively low conversions per pass.

Example 3

95% propylene was passed over a catalyst consisting of 6.5% by weight of boron trifluoride adsorbed upon a crude bauxite sold commercially as "Low Iron Porocel" at the rate of 213 pounds per hour per liter of catalyst at 85° C. and under sufficient pressure to keep the stream liquified. Unreacted propylene was continuously separated from the polymer in the reaction product and recycled. The conversion was 0.181% per pass to hexenes and 0.319% to total mixed polymer. The hexene fraction contained about 25% by volume of tetramethylethylene.

Example 4

95% propylene was passed over a catalyst consisting of activated clay (Kleenflo) carrying 121 grams of boron trifluoride per liter at the rate of 167 pounds per hour per liter of catalyst at a temperature of 84° C. and sufficient pressure to keep the hydrocarbon liquid. Conversion to polymer per pass was 0.84%. The polymer contained 31.3% hexenes by weight, and the hexene fraction contained 14% tetramethylethylene by volume. An operation carried out similarly except with the use of boron trifluoride on a bauxite sold as "Regular Porocel" saturated with boron trifluoride gave a conversion to polymer of 0.825% per pass, the polymer containing 28.2% hexene by weight. Of the hexene fraction 26.5% by volume was tetramethylethylene.

In view of the temperatures employed it will be understood that those parts of the system in which propylene is present in liquid form will be under superatmospheric pressure, the exact magnitude of which will depend upon the temperature prevailing and upon other well known factors.

Furthermore, for simplicity I have not discussed or illustrated in detail conventional equipment such as pumps, valves, receivers, level controllers, etc. the use and purposes of which are well known to persons skilled in the art.

Various modifications are possible within the scope of the invention. It is intended that the patent shall cover, by suitable expression in its

I claim:

1. A process for the manufacture of tetramethylethylene comprising continuously passing a propylene-containing stream having substantially no other olefin present in liquid phase and under temperature conditions between 25° C. and 94° C. over a substantially water-free catalyst bed comprising a solid BF₃-adsorbing catalyst carrier which is itself relatively inactive toward olefin polymerization and which contains between 0.5% and 12% by weight of said catalyst bed of adsorbed boron trifluoride at a space velocity sufficiently high to restrict the amount of polymers formed per pass to less than 20% by weight of the total flow, and thereafter introducing the polymer-containing stream thus produced into an intermediate section of a fractionating column, in which the head temperature is maintained within 20° C. of the critical temperature of the distillate, and therein separating the feed into an overhead fraction comprising polymer-free propylene and a bottoms fraction comprising propylene-free polymer, combining said heads fraction with said propylene-containing stream for recycling, and simultaneously passing said bottoms stream into a second fractionating system wherein tetramethylethylene is separated from other constituents of said stream by fractional distillation.

2. The process of claim 1 in which the polymerization is conducted under temperature conditions between 50° C. and 94° C.

3. The process of claim 1 in which boron trifluoride is progressively introduced into the propylene-containing stream upstream of the catalyst bed while maintaining the total quantity of BF₃ present in said process between 0.5% and 12% by weight of the catalyst bed.

4. The process of claim 1 in which the propylene feed contains propane.

5. The process of claim 1 in which the BF₃ present is maintained between 0.5% and 8% by weight of the catalyst bed.

6. A process for the manufacture of tetramethylethylene comprising continuously passing a propylene-containing stream having substantially no other olefin present in liquid phase and under temperature conditions between 25° C. and 94° C. over a substantially water-free catalyst bed comprising a solid BF₃ adsorbing catalyst carrier which is itself relatively inactive toward olefin polymerization and which contains between 0.5% and 12% by weight of said catalyst bed of adsorbed boron trifluoride at a space velocity sufficiently high to restrict the amount of polymers formed to less than 20% by weight of the total flow.

JOHN BARRY DAVIDSON.

References Cited in the file of this patent

UNITED STATES PATENTS

| Number | Name | Date |
|---|---|---|
| 2,404,788 | Burk et al. | July 30, 1946 |
| 2,482,008 | Kleber | Sept. 13, 1949 |